Oct. 25, 1938.  C. W. SPROULL ET AL  2,134,277
VALVE MECHANISM
Filed July 23, 1936  2 Sheets-Sheet 2
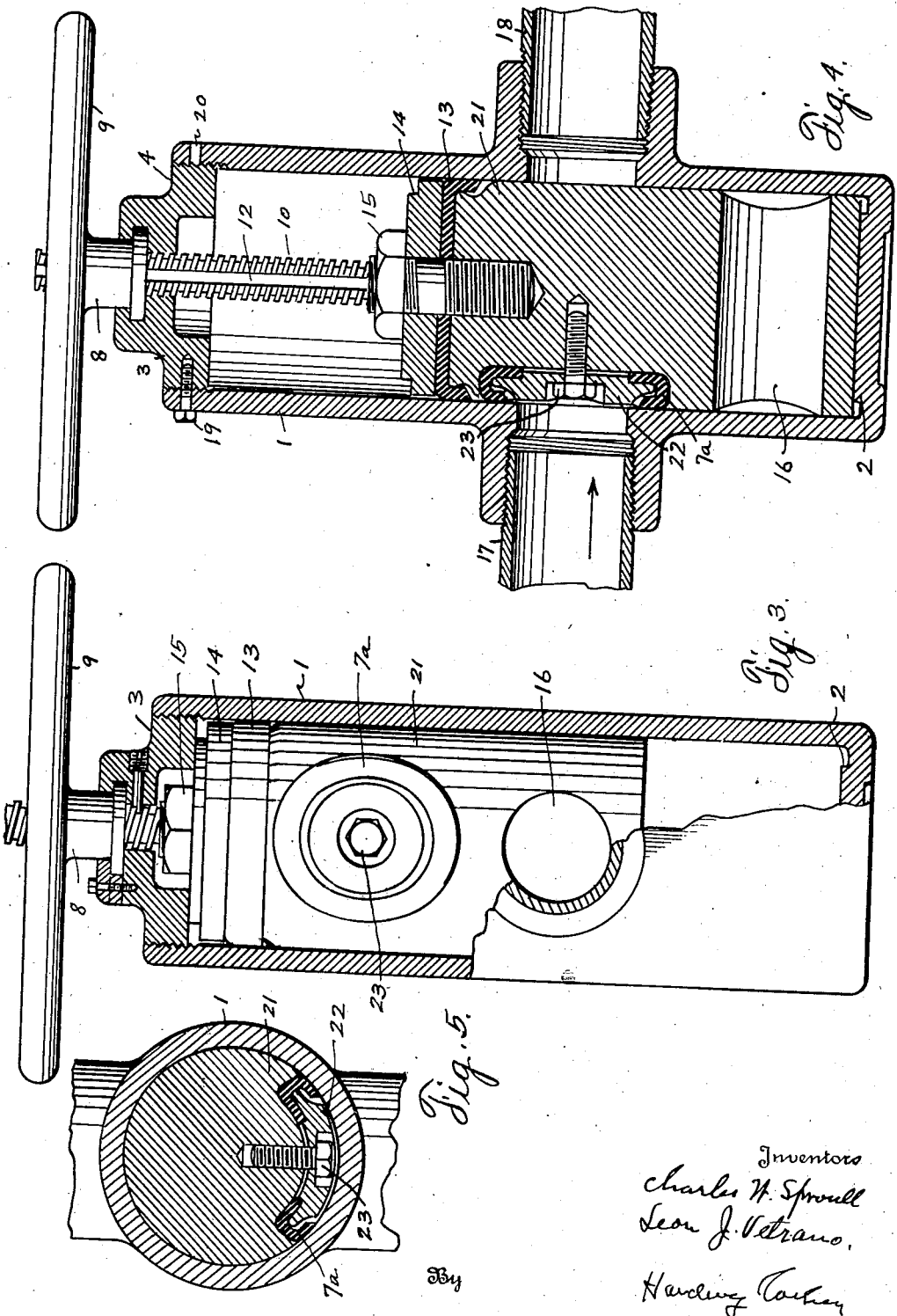

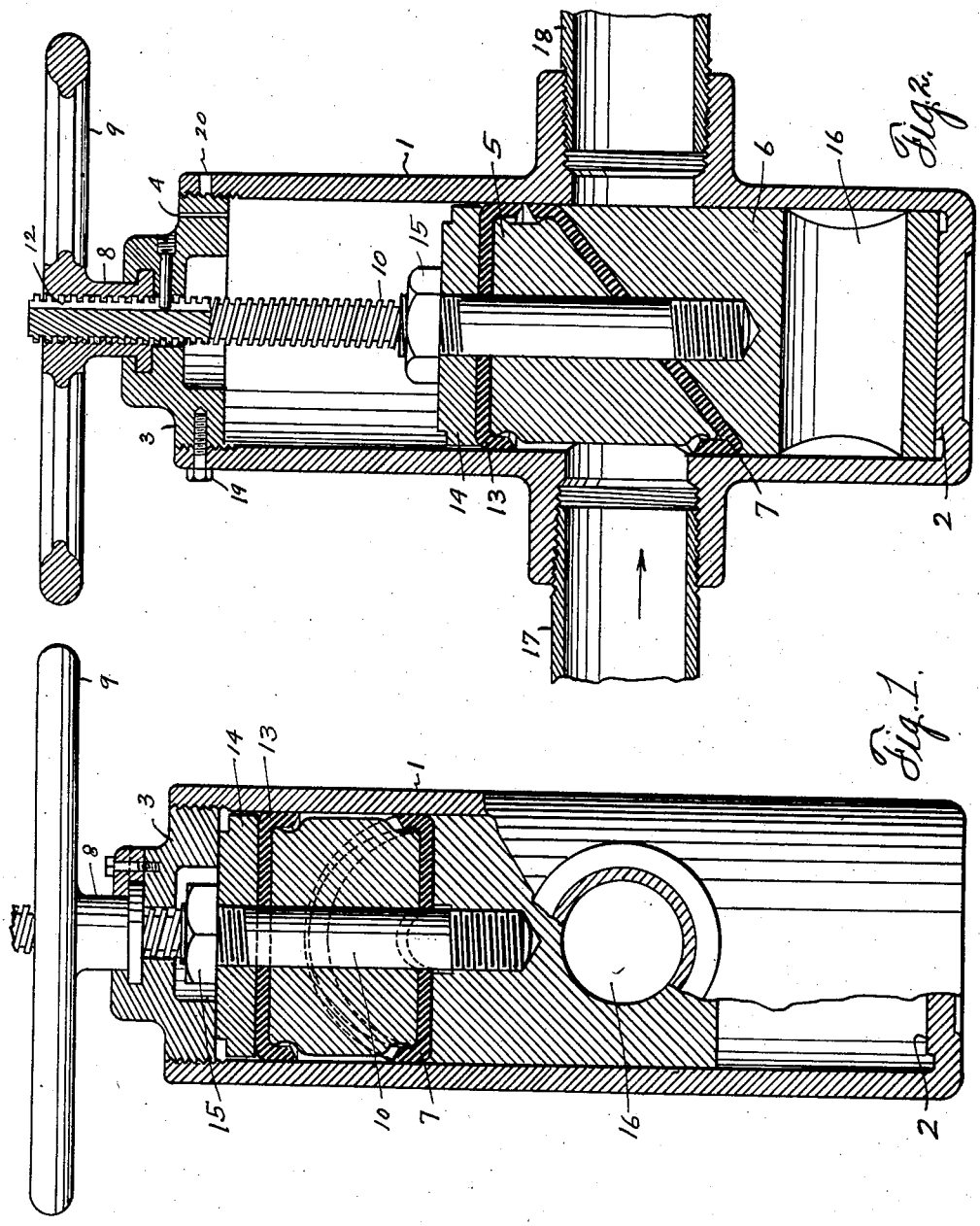

Patented Oct. 25, 1938

2,134,277

UNITED STATES PATENT OFFICE 2,134,277

VALVE MECHANISM

Charles W. Sproull and Leon J. Vetrano, Houston, Tex.

Application July 23, 1936, Serial No. 92,106

4 Claims. (Cl. 251—51)

This invention relates to a valve mechanism and has particular relation to that type of valve mechanism adapted to be connected into a liquid conducting line and whereby the line may be opened and closed, the valve being equipped with a novel type of packing to prevent leakage.

It is another object of the invention to provide valve mechanism of the character described embodying a casing connected into a fluid con10 ducting line and a valve movably mounted in the casing and having a flowway therethrough which may be moved into and out of registration with the line to open and close the valve, said valve being equipped with novel packing means to pre15 vent leakage past the valve when it is in closed position.

With the above and other objects in view, the invention has particular relation to certain novel features of construction, operation and arrange20 ment of parts, an example of which is given in this specification and illustrated in the accompanying drawings, wherein:

Figure 1 shows an elevational view of the valve shown partly in section.

Figure 2 shows a vertical sectional view taken at right angles of the view shown in Figure 1.

Figure 3 shows an elevational view partly in section of a modified form of the valve.

Figure 4 shows a vertical view thereof taken at right angles to the form shown in Figure 3, and Figure 5 shows a cross sectional view of the form shown in Figure 4.

Refering now more particularly to the draw35 ings wherein like numerals of reference designate the same parts in each of the figures the numeral 1 designates a valve casing which is preferably cylindrical in form. This casing is permanently closed at one end 2 and is closed at its other end by the cap 3 which is screwed therein and is provided with a leak duct 4. In the form shown in Figures 1 and 2 the valve proper is formed of two sections 5, 6 whose abutting faces are diagonal and a cap shaped packing 7 is fitted between said sections. There is an actuating nut 8 which has a swivelling connection with the cap 3 which is turnable by means of the hand wheel 9. An actuating rod 10 has its outer end correspondingly threaded through the nut 8 and is keyed against turning relative to the cap 4 by the key 11 whose inner end projects into the longitudinal keyway 12 in said rod. The inner end of the rod 10 is blank and is fitted snugly through the section 5 of the valve and is screwed into the section 6. A cup ring 13 is clamped on the outer end of the section 5 by means of the clamp plate 14 through which the rod 10 extends and the valve parts are held firmly clamped together by the clamp nut 15 which is threaded on to the rod 10 and abuts the clamp plate 14. The valve section 6 has a flowway 16 therethrough. The margins of the cup rings 7 and 13 are overturned toward each other as shown in Figure 2 and fit closely within the valve casing 1. Inlet and outlet lines 17, 18 are connected into the valve casing. When it is desired to close the valve the nut 8 may be turned in an appropriate direction to move the flowway 16 out of registration with the lines 17, 18. When the valve reaches the limit of its movement as shown in Figure 2, the cup ring 7 will completely span the inflow line 17 which carries the liquid under pressure and the cup ring 7 will form a seal entirely around the valve casing and across the path of the oncoming flow so as to prevent any leakage past the valve. The cup ring 13 will also form a seal entirely around the valve casing opposite the cup ring 7 so that there can be no leakage past the valve when the valve is closed.

The cap 3 is secured in place by means of a set screw 19. It will be noted that on the opposite side of the valve casing there is an opening 20. Should the grit in the fluid cut out or wear the material of the valve casing around the inlet opening the set screw 19 may be removed and the cap 3 and valve assembly given a half turn and the valve casing 1 then reversed in its position with respect to the lines 17 and 18 so that the original outlet opening of the casing will become the inlet opening and the mechanism in effect thus renewed. The set screw 19 may then be reinserted through the opening 20 and screwed into place.

In the form shown in Figures 3 and 4 the valve 21 is substantially cylindrical and is fitted closely into the casing 1. In this form the valve is provided also with the cup ring 13 which is clamped against the end of the valve by the clamp plate 14, said clamp plate being secured in position on the rod 10 by the clamp nut 15 as in the other figures. The form shown in Figures 3 and 4 differ, however from that shown in Figures 1 and 2 in that there is a cup ring 7a countersunk into the side of the valve 21 and surrounding the inlet opening from the inlet line 17. This cup ring 7a is anchored securely in place by a clamp plate 22 which clamps thereagainst and is secured to the valve by the set bolt 23. This cup ring 7a prevents any leak of the oncoming fluid around the valve when the valve is closed and the cup ring 13 in all of the forms prevents the leakage of liquid up past the valve into the valve casing. In the form shown in Figures 3 and 4 the valve 21 has the flowway 16 as in the other figures.

In case the material around the inlet opening of the form shown in Figures 3 and 4 should become cut out or worn away by the grit in the oncoming fluid, the valve assembly may be given a half turn in the valve casing in the manner hereinabove explained in connection with the description of Figures 1 and 2 and the casing may then be reversed with respect to the inlet and outflow lines as hereinabove explained and the valve thus renewed.

The valve 21 in the form shown in Figures 3 and 4 is actuated in the manner similar to that explained in connection with the explanation of the operation of the type of valve disclosed in Figures 1 and 2.

The drawings and description disclose what is now considered to be a preferred form of the invention by way of illustration only while the broad principle of the invention will be defined by the appended claims.

What we claim is:

1. A valve mechanism comprising a valve casing having an inlet opening and an outlet opening, a valve movable longitudinally in the casing into active position to close the inlet opening and into inactive position to clear said inlet opening, means for so moving the valve, said valve having a packing countersunk into one side thereof and formed with a flexible margin overturned toward said inlet opening and arranged to fit constantly closely against the adjacent wall of the casing and to surround the inlet opening when the valve is in said active position, the material of the valve being extended beyond the packing, and being thus effective to close said inlet opening, as the valve is moved toward active position, before the packing reaches a position where it is impinged by direct flow of fluid.

2. A valve mechanism comprising a cylindrical valve casing having an inlet and an outlet opening, a cylindrical valve fitted snugly in the casing and movable longitudinally thereof into one position to close said openings and into another position to clear said openings, the side of the valve adjacent the inlet opening having an approximately circular countersunk recess therein, a packing fitted into the recess and completely surrounding the inlet opening when the valve is in closed position, said packing being sufficiently spaced from the end of the valve and having an overturned margin directed toward the inlet opening, when the valve is in closed position and being flexible and fitting closely against the wall of the casing around the inlet opening, said margin being exposed to the outward pressure of the liquid whereby it is held closely against said wall the end of the valve spaced from said packing being adapted to close said inlet before the packing reaches a position where it will be impinged by direct flow of fluid.

3. A valve mechanism comprising a valve casing having an inlet opening and an outlet opening, a valve slidable in the casing and movable across the inlet opening into one position to close the inlet opening and into another position to open said inlet opening, said valve having a recess in the side thereof adjacent the inlet opening, annular packing in said recess having an annular, inwardly turned, flexible margin arranged to fit closely against the adjacent wall of the casing and to closely surround the inlet opening when the valve is in closed position, said packing being sufficiently spaced from the forward end of the valve so that as the valve is moved to closed position the inlet will be closed by said forward end before the packing reaches a position where it will be impinged by direct flow of fluid.

4. A valve mechanism comprising a valve casing having an inlet opening, a valve in the casing having a side recess movable longitudinally of the casing and across the inlet opening into one position to close said opening and into another position to open said inlet opening, means for moving the valve into either of said positions, said valve having a packing in said recess whose margin is outwardly thickened to contact with the casing wall and approximately flush with the surface of the valve to fit closely against the inside wall of the casing, said packing being shaped to surround said inlet opening and to fit closely against the wall of the casing around and adjacent said opening when the valve is in position to close said opening, said packing having an inturned margin and spaced sufficiently from the forward end of the valve so that as the valve is moved to closed position the inlet will be closed by said forward end before the packing reaches a position where it will be impinged by direct flow of fluid.

CHARLES W. SPROULL.
LEON J. VETRANO.